United States Patent
Tajima et al.

(10) Patent No.: US 8,959,893 B2
(45) Date of Patent: Feb. 24, 2015

(54) GUIDANCE OUTPUT DEVICE, GUIDANCE OUTPUT METHOD, AND CONSTRUCTION MACHINE EQUIPPED WITH GUIDANCE OUTPUT DEVICE

(75) Inventors: Kentarou Tajima, Kanagawa (JP); Seiji Kamada, Kanagawa (JP); Koichi Yamashita, Kanagawa (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 330 days.

(21) Appl. No.: 13/635,277

(22) PCT Filed: Nov. 4, 2011

(86) PCT No.: PCT/JP2011/075425
§ 371 (c)(1),
(2), (4) Date: Sep. 14, 2012

(87) PCT Pub. No.: WO2012/086317
PCT Pub. Date: Jun. 28, 2012

(65) Prior Publication Data
US 2013/0006495 A1    Jan. 3, 2013

(30) Foreign Application Priority Data
Dec. 24, 2010 (JP) ................... 2010-288858

(51) Int. Cl.
*B60K 35/00* (2006.01)
*E02F 9/26* (2006.01)
(Continued)

(52) U.S. Cl.
CPC ............ *F02D 41/027* (2013.01); *E02F 9/0866* (2013.01); *E02F 9/2246* (2013.01);
(Continued)

(58) Field of Classification Search
USPC .......... 60/285, 286, 295, 297, 299–302, 311; 701/21, 51, 182, 482
See application file for complete search history.

(56) References Cited

U.S. PATENT DOCUMENTS 6,851,207 B2 * 2/2005 Yoshimatsu .................... 37/348
7,483,814 B2 * 1/2009 Hoshi et al. .................... 702/182
(Continued)

FOREIGN PATENT DOCUMENTS

| JP | 2002-285890 A | 10/2002 |
| JP | 2005-098073 A | 4/2005 |

(Continued)

OTHER PUBLICATIONS

International Search Report mailed Dec. 6, 2011 in International Application No. PCT/JP2011/075425, including English translation, 4 pages.

(Continued)

*Primary Examiner* — Audrey K Bradley
*Assistant Examiner* — Dapinder Singh
(74) *Attorney, Agent, or Firm* — Fish & Richardson P.C.

(57) ABSTRACT

A guidance output device, which outputs guidance for improving fuel economy when an energy wasting operation is detected in a construction machine that is provided with an exhaust gas purifying device for an internal combustion engine, includes a regeneration process determining unit that determines whether a regeneration process is in progress in the exhaust gas purifying device. It also includes a guidance output restriction unit that restricts an output of the guidance for energy saving by the guidance output unit when the regeneration process determining unit determines that the regeneration process is in progress in the exhaust gas purifying device.

10 Claims, 15 Drawing Sheets

(51) Int. Cl.
    *F02B 77/08*     (2006.01)
    *F02D 29/00*     (2006.01)
    *F02D 29/02*     (2006.01)
    *F02D 45/00*     (2006.01)
    *G01F 9/00*     (2006.01)
    *F02D 41/02*     (2006.01)
    *E02F 9/08*     (2006.01)
    *E02F 9/22*     (2006.01)
    *F01N 11/00*     (2006.01)
    *F01N 3/035*     (2006.01)
    *F02D 41/22*     (2006.01)
    *F01N 3/10*     (2006.01)
    *F01N 3/023*     (2006.01)
    *F01N 3/025*     (2006.01)

(52) U.S. Cl.
    CPC ............... *E02F 9/26* (2013.01); *F01N 11/00* (2013.01); *F01N 3/035* (2013.01); *F02D 2041/228* (2013.01); *F01N 3/106* (2013.01); *F01N 3/023* (2013.01); *F01N 3/0253* (2013.01); *F01N 2550/04* (2013.01); *Y02T 10/47* (2013.01)
    USPC ............... 60/285; 60/286; 60/295; 60/297; 60/299; 60/311; 701/182; 701/482; 701/21; 701/51

(56) References Cited

U.S. PATENT DOCUMENTS

| | | | |
|---|---|---|---|
| 2002/0045986 A1* | 4/2002 | Tamaru | 701/211 |
| 2003/0193406 A1* | 10/2003 | Kinugawa | 340/870.16 |
| 2005/0027423 A1* | 2/2005 | Minami et al. | 701/51 |
| 2005/0150142 A1 | 7/2005 | Matsuda et al. | |
| 2006/0287841 A1 | 12/2006 | Hoshi et al. | |
| 2010/0122522 A1 | 5/2010 | Tsukada et al. | |

FOREIGN PATENT DOCUMENTS

| | | |
|---|---|---|
| JP | 2006-083828 A | 3/2006 |
| JP | 2009-257323 A | 11/2009 |
| JP | 2010-121466 A | 6/2010 |
| KR | 10-2006-0128830 A | 12/2006 |

OTHER PUBLICATIONS

Notice of Allowance issued Sep. 23, 2013 in corresponding Korean Patent Application No. 2012-7023851, including English translation, 3 pages.

* cited by examiner

FIG.5

| NAME OF FUEL-CONSUMPTION-DETERIORATING OPERATION ITEM | JUDGMENT CONDITIONS | GUIDANCE | | PRIORITY |
|---|---|---|---|---|
| | | ECO-GUIDANCE | ONE-POINT GUIDANCE | |
| IDLING FOR A LONG TIME | • ALL CONTROL LEVERS NOT OPERATED<br>• CONTINUATION FOR A PREDETERMINED TIME | REFRAIN FROM IDLING FOR A LONG TIME | FREQUENT IDLING STOP REDUCES FUEL CONSUMPTION | 1 |
| E-MODE RECOMMENDATION | • NOT IN E-MODE<br>• GENERATED POWER WITHIN E-MODE | USE OF E-MODE RECOMMENDED | USE OF E-MODE REDUCES FUEL CONSUMPTION | 2 |

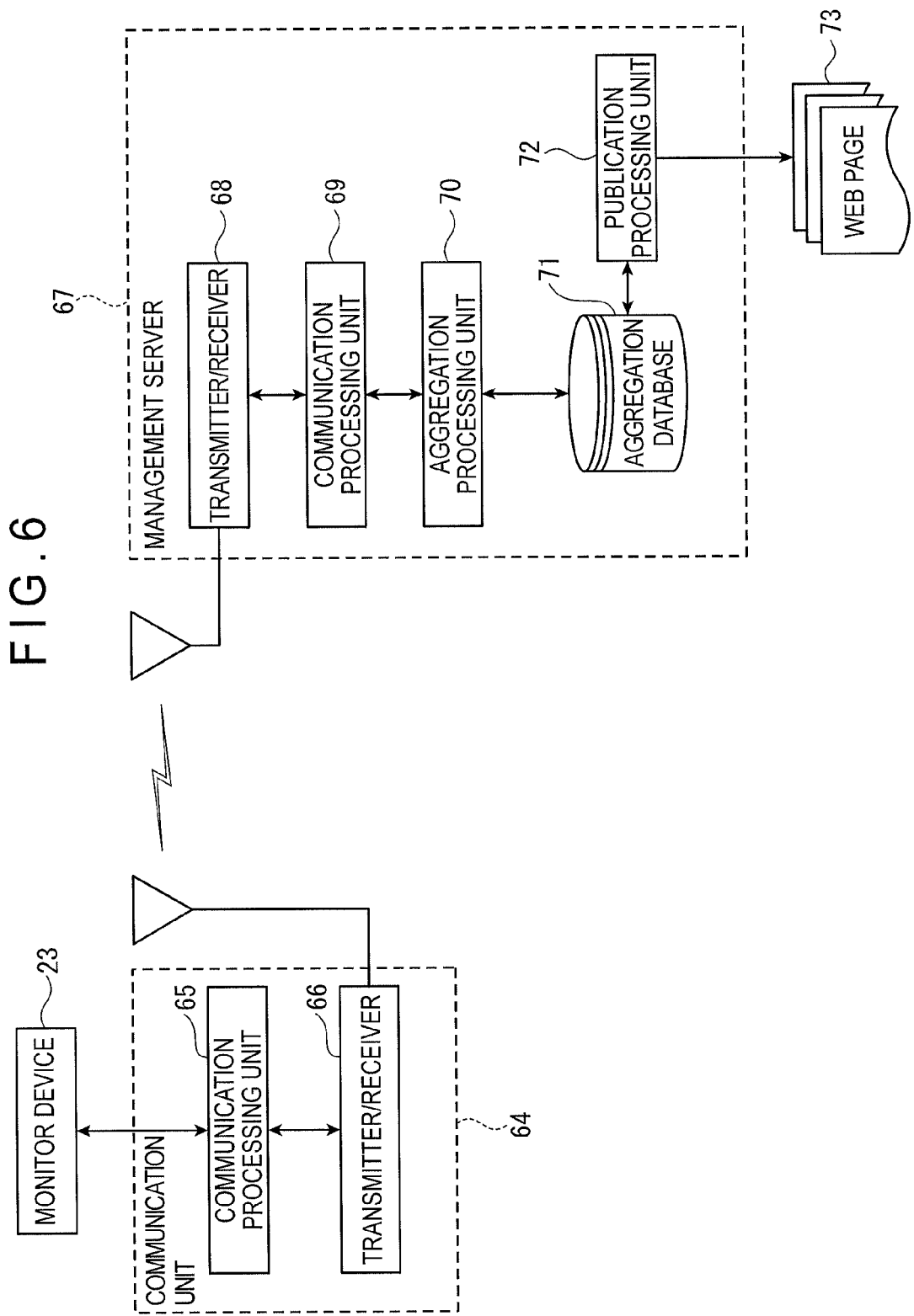

GUIDANCE OUTPUT DEVICE, GUIDANCE OUTPUT METHOD, AND CONSTRUCTION MACHINE EQUIPPED WITH GUIDANCE OUTPUT DEVICE

CROSS-REFERENCE TO RELATED APPLICATIONS

This application claims priority to Application No. PCT/JP2011/075425, filed Nov. 4, 2011, which application claims priority to Japanese Application No. 2010-288858, filed on Dec. 24, 2010. The contents of the above applications are incorporated herein by reference in their entireties.

TECHNICAL FIELD

The present invention relates to a guidance output device, a guidance output method, and a construction machine equipped with the guidance output device.

BACKGROUND ART

Some of construction machines detect conditions of various objects such as a water temperature of engine cooling water, level of remaining fuel, temperature of hydraulic fluid and the like and display the conditions on a monitor device. In recent years, energy saving is demanded also for construction machines, where it is demanded, for instance, that fuel consumption is reduced. In response to such a demand, for instance, it is known to employ displaying a difference between a target fuel consumption rate and an actual fuel consumption rate to notify the difference to an operator or a sign for prompting an improvement in fuel economy when the fuel consumption rate exceeds a target value (see, for instance, Patent Literature 1).

For instance, as shown in FIG. 15, a known technique employs a sign G0 messaging "refrain from idling for a long time", "stop idling" and the like displayed on a monitor screen 101 of a monitor device 100 provided in a cab of a construction machine to prompt an operator to improve fuel economy.

On the other hand, some of known vehicles (e.g. construction machines) including a diesel engine as a drive source are provided with a exhaust gas purifying device for an internal combustion engine including a DPF (Diesel Particulate Filter) for removing a PM (Particulate Matter) contained in the exhaust gas of the diesel engine.

In such a construction machine including the exhaust gas purifying device for an internal combustion engine, a regeneration process for burning the PM deposited in the DPF is widely performed. Specifically, in such a construction machine, a guidance for prompting the regeneration process is displayed on a monitor device when the PM deposited in the DPF reaches a predetermined level (see, for instance, Patent Literature 2).

Then, when the guidance for prompting the regeneration process is displayed on the monitor device and an operator performs the regeneration process of the DPF of the exhaust gas purifying device in accordance with the guidance, the operator stops operations of work equipment and the like and holds the construction machine in an idling state.

CITATION LIST

Patent Literatures

Patent Literature 1: JP-A-2005-98073
Patent Literature 2: JP-A-2009-257323

SUMMARY OF THE INVENTION

Problem to be Solved by the Invention

However, when the technique disclosed in Patent Literature 1 is applied to a construction machine provided with the exhaust gas purifying device for the internal combustion engine, though an operator has to keep the idling state without operating a control lever of work equipment or an accelerator of an engine during the regeneration process of the DPF, the controller of the construction machine may judge that the construction machine is in an energy wasting operation and displays on a monitor device a guidance for prompting the operator to improve fuel economy.

An object of the invention is to provide a guidance output device and a guidance output method that do not output an unnecessary guidance for improvement in fuel economy during a regeneration process using a exhaust gas purifying device for an internal combustion engine, and a construction machine provided with the guidance output device.

Means for Solving the Problems

A guidance output device according to a first aspect of the invention outputs a guidance for energy saving of an internal combustion engine provided in a construction machine comprising an exhaust gas purifying device for the internal combustion engine, the guidance output device including: a guidance storage that stores the guidance for energy saving corresponding to an energy wasting operation of the construction machine; an occurrence detector that detects an occurrence of the energy wasting operation while the construction machine is operated; a guidance output unit that outputs the guidance for energy saving corresponding to the energy wasting operation when the energy wasting operation is detected by the occurrence detector; a status detector that detects a status of the exhaust gas purifying device; a regeneration process determining unit that determines whether a regeneration process of the exhaust gas purifying device is in progress or not; and a guidance output restricting unit that restricts an output of the guidance for energy saving by the guidance output unit when the regeneration process determining unit determines that the regeneration process of the exhaust gas purifying device is in progress.

A guidance output device according to a second aspect of the invention is the guidance output device according to the first aspect of the invention, in which the guidance storage stores a plurality of items for the guidance.

A guidance output device according to a third aspect of the invention is the guidance output device according to the second aspect of the invention, in which the guidance that is restricted from being outputted by the guidance output restricting unit is a guidance that prompts to stop an engine.

A guidance output device according to a fourth aspect of the invention is the guidance output device according to the third aspect of the invention, further including a priority item determining unit that determines the energy wasting operation for which the guidance for energy saving is to be preferentially outputted based on a frequency of the energy wasting operation and a priority order of the energy wasting operation stored in the guidance storage.

A guidance output device according to a fifth aspect of the invention is the guidance output device according to any one of the first to fourth aspects of the invention, further including an operation detector that detects an operation of an operating unit for operating a work equipment of the construction machine, in which the guidance output unit outputs the guidance judging that the construction machine is in the energy wasting operation when it is determined by the operation detector while the engine of the construction machine is in operation that the operating unit is not operated for a predetermined time or the operating unit is locked.

A guidance output device according to a sixth aspect of the invention is the guidance output device according to any one of the first to fifth aspects of the invention, in which the guidance output restricting unit restricts the output of the guidance for energy saving when the exhaust gas purifying device is manually operated to perform the regeneration process.

A guidance output device according to a seventh aspect of the invention is the guidance output device according to any one of the first to sixth aspects of the invention, in which the guidance output unit displays the guidance on a display provided to the construction machine, and the guidance output unit displays on the display that the regeneration process is in progress during the regeneration process of the exhaust gas purifying device.

A guidance output device according to an eighth aspect of the invention is the guidance output device according to any one of the first to seventh aspects of the invention, in which the guidance output unit comprises a timer that counts a time from starting the energy wasting operation detected by the occurrence detector and an output unit that outputs the guidance when the time counted by the timer exceeds a predetermined time, and the guidance output restricting unit clears the elapsed time counted by the timer during the regeneration process along with restricting the output of the guidance by the guidance output unit.

A guidance output device according to a ninth aspect of the invention outputs a guidance for energy saving of an internal combustion engine provided in a construction machine comprising an exhaust gas purifying device for the internal combustion engine, the guidance output device including: a guidance storage that stores a plurality of the guidance for energy saving corresponding to an energy wasting operation of the construction machine; an occurrence detector that detects an occurrence of the energy wasting operation while the construction machine is operated; a guidance output unit that outputs the guidance for energy saving corresponding to the energy wasting operation when the energy wasting operation is detected by the occurrence detector; a status detector that detects a status of the exhaust gas purifying device; a regeneration process determining unit that determines whether a regeneration process of the exhaust gas purifying device is in progress or not; a guidance output restricting unit that restricts the output of the guidance for energy saving by the guidance output unit when the regeneration process determining unit determines that the regeneration process of the exhaust gas purifying device is in progress; and a priority item determining unit that determines the energy wasting operation for which the guidance for energy saving is to be preferentially outputted based on a frequency of the energy wasting operation and a priority order of the energy wasting operation stored in the guidance storage, in which the guidance of which output is restricted by the guidance output restricting unit is a guidance that prompts to stop an engine, and the guidance output restricting unit restricts the output of the guidance for energy saving when the exhaust gas purifying device is manually operated to perform the regeneration process.

A guidance output method according to a tenth aspect of the invention outputs a guidance for energy saving of an internal combustion engine provided in a construction machine comprising an exhaust gas purifying device for the internal combustion engine, the guidance output method including: storing in advance the guidance for energy saving corresponding to an energy wasting operation of the construction machine; detecting an occurrence of the energy wasting operation while the construction machine is operated; outputting the guidance for energy saving corresponding to the energy wasting operation when the energy wasting operation is detected in the detecting of the occurrence; detecting a status of the exhaust gas purifying device; determining whether a regeneration process of the exhaust gas purifying device is in progress or not based on the detecting of the status; and restricting the output of the guidance for energy saving in the outputting of the guidance when it is determined that the regeneration process of the exhaust gas purifying device is in progress.

A construction machine according to an eleventh aspect of the invention includes: an exhaust gas purifying device for an internal combustion engine; and the guidance output device according to any one of the first to ninth aspects of the invention.

According to the guidance output device of the first aspect of the invention, since the regeneration process detector and the guidance output restricting unit are provided, the output of the guidance for energy saving by the guidance output unit is restricted even when the operator does not operate work equipment at all while the regeneration process of the exhaust gas purifying device for the internal combustion engine is in progress. Accordingly, it is not judged that an energy wasting operation of the construction machine has occurred.

According to the guidance output device of the second aspect of the invention, if the guidance storage includes the plurality of items for the guidance, since the output of the guidance by the guidance output restricting unit is restricted when the guidance output unit displays the guidance that prompts to stop the engine, the display of the other items of the guidance is not restricted.

According to the guidance output device of the third aspect of the invention, since the guidance that prompts to stop the engine for improving fuel economy is not displayed, unnecessary guidance for improving fuel economy is not outputted.

According to the guidance output device of the fourth aspect of the invention, since only the output of the guidance that prompts to stop the engine is restricted even when the energy wasting operation for which the guidance is to be preferentially outputted is determined among the plurality of items for the guidance by the preferential item determining unit, the output of the guidance according to the rest of the items for the guidance is not affected.

According to the guidance output device of the fifth aspect of the invention, the guidance output restricting unit can prevent the guidance from being outputted by the guidance output unit judging that the construction machine is in the energy wasting operation when the operating unit of the work equipment of the construction machine is not operated for a predetermined time or the operating unit of the work equipment is locked.

According to the guidance output unit of the sixth and ninth aspects of the invention, since the guidance output restricting unit restricts the output of the guidance for energy saving when the exhaust gas purifying device is manually operated to perform the regeneration process, it is not judged that an energy wasting operation of the construction machine has occurred when an operator performs the regeneration process of the exhaust gas purifying device.

According to the guidance output unit of the seventh aspect of the invention, since the guidance output restricting unit outputs the guidance on the display indicating that the regeneration process is in progress during the regeneration process of the exhaust gas purifying device, an operator can visually recognize the regeneration process of the exhaust gas purifying device and is not likely to erroneously operate a work equipment lever and the like.

According to the eighth aspect of the invention, the guidance output restricting unit clears the elapsed time counted by the timer when the guidance output unit includes the timer for counting the time from starting the energy wasting operation detected by the occurrence detector, so that the guidance output unit does not output the guidance from the output unit based on previously counted time after completing the regeneration process of the exhaust gas purifying device.

According to the guidance output method of the tenth aspect of the invention and the construction machine of the eleventh aspect of the invention, the same effects and advantages as those in the first aspect of the invention can be obtained.

BRIEF DESCRIPTION OF DRAWINGS

FIG. 5 is a diagram showing a structure of a guidance storage in the monitor device of the exemplary embodiment.

FIG. 6 is a functional block diagram showing a communication system between the monitor device and a management server of the exemplary embodiment.

DESCRIPTION OF EMBODIMENT(S)

An exemplary embodiment of the invention will be described below with reference to the attached drawings.

[1] Overall Arrangement

Figure 1:
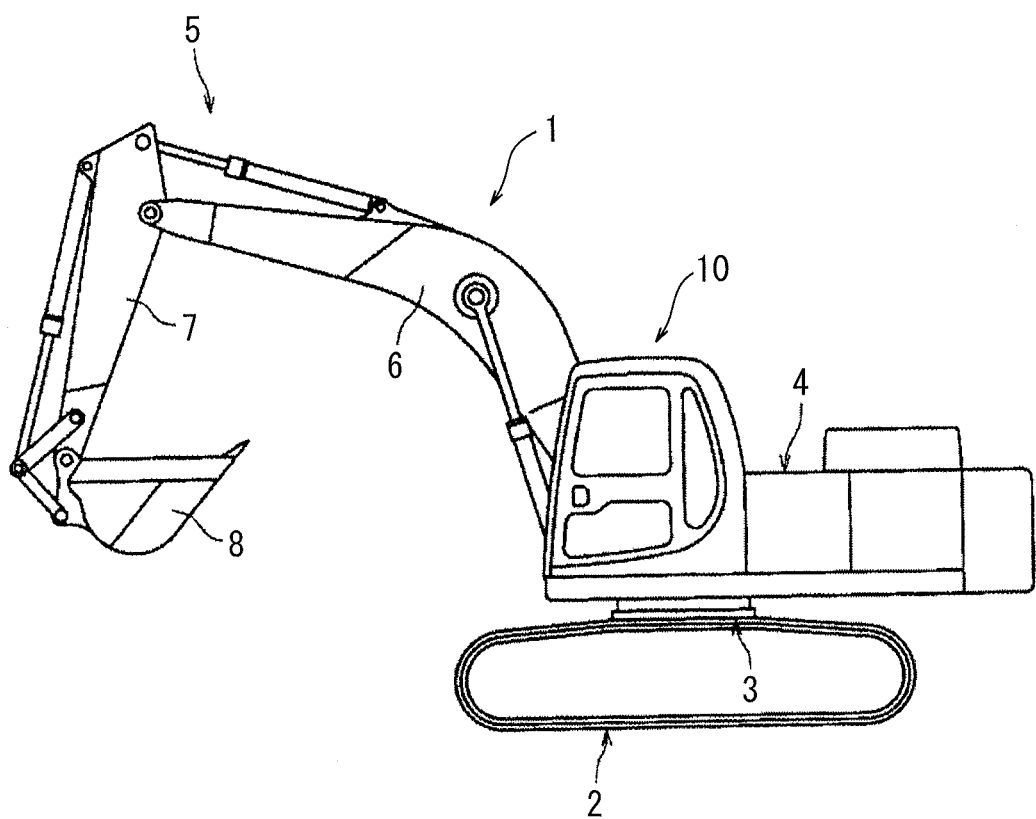
FIG. 1 is a side elevation showing a construction machine according to an exemplary embodiment of the invention.

FIG. 1 shows a hydraulic excavator 1 (construction machine) according to an exemplary embodiment of the invention.

The hydraulic excavator 1 includes: an undercarriage 2; an upper swing body 4 mounted on an upper side of the undercarriage 2 via a rotating mechanism 3 in a rotatable manner; and work equipment 5 provided to the upper swing body 4.

The work equipment 5 includes: a boom 6 of which base is connected to the upper swing body 4 in a manner capable of a pivot movement; an arm 7 connected to an end of the boom 6 in a manner capable of a pivot movement; and a bucket 8 connected to an end of the arm 7 in a manner capable of a pivot movement.

The upper swing body 4 includes a cab 10 for an operator driving the hydraulic excavator 1 to get in.

Figure 2:
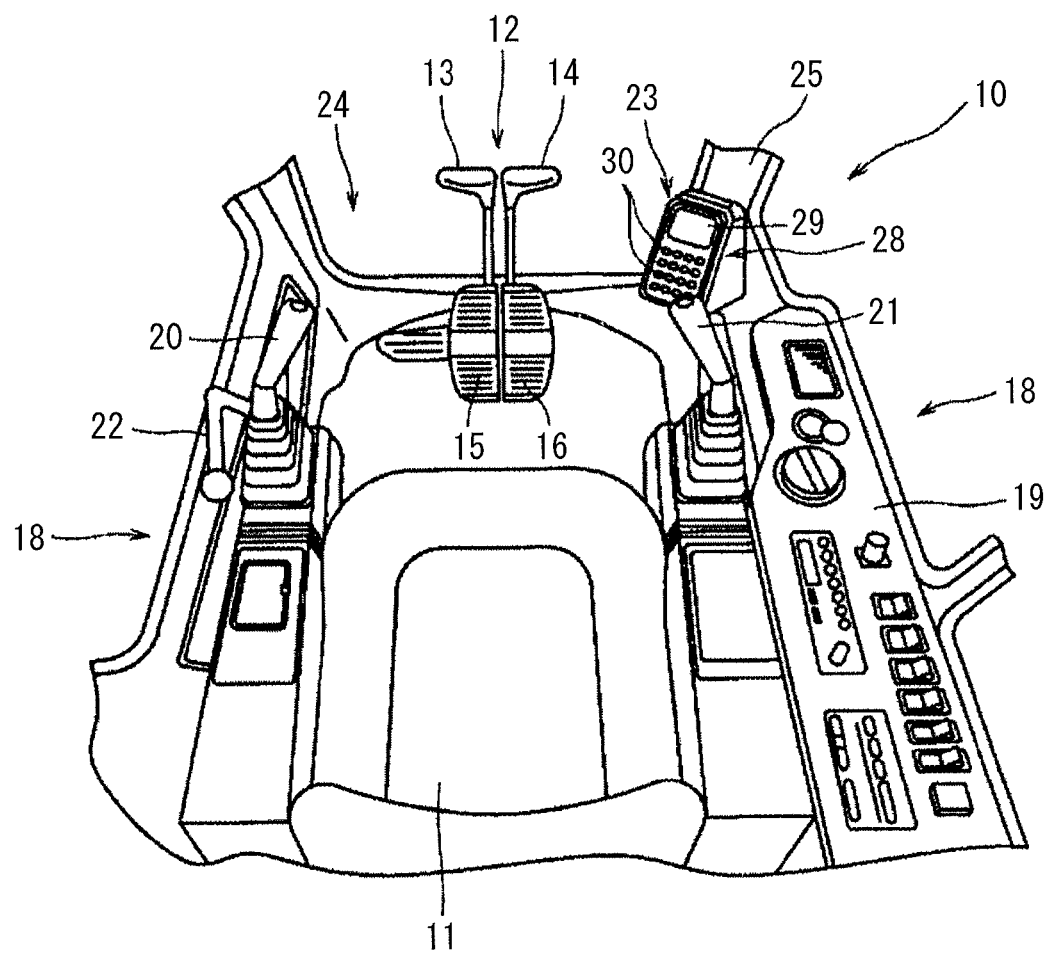
FIG. 2 is a perspective showing a part of a cab of the construction machine of the exemplary embodiment.

As shown in FIG. 2, an operator's seat 11 is situated at the center of the cab 10 of the upper swing body 4 and a travel operation unit 12 is provided at the front of the operator's seat 11. The travel operation unit 12 includes drive levers 13 and 14 and drive pedals 15 and 16 that are moved forward and backward integrally with the drive levers 13 and 14.

The undercarriage 2 of the hydraulic excavator 1 of this exemplary embodiment advances when pushing the drive levers 13 and 14 forward and moves backward when pulling the drive levers 13 and 14 rearward. An instrument panel 19 is provided at a right side of the operator's seat 11 (i.e. near a side window 18).

Control levers 20 and 21 are provided on respective sides of the operator's seat 11. The control lever 20 effects a swing movement of the arm 7 and a rotation of the upper swing body 4. The control lever 21 effects a vertical (i.e. up and down) movement of the boom 6 and a turning movement of the bucket 8. A lock lever 22 is provided near the control lever 20.

The lock lever 22 stops an operation of the work equipment 5, the rotation of the upper swing body 4, a travel movement of the undercarriage 2 and the like. In other words, by pulling the lock lever 22 upward, the movement of the work equipment 5 and the like can be locked, where the work equipment 5 and the like do not work even when the control levers 20 and 21 and the like are operated.

A monitor device 23 for displaying various conditions (e.g. engine water temperature, hydraulic fluid temperature and fuel level) of the hydraulic excavator 1 is provided in the cab 10.

The monitor device 23 is provided at a lower side of one of vertical frames 25 that separate a front window 24 from the side windows 18 in the cab 10. A monitor screen 29 and control push buttons 30 are provided on a front side of an exterior case 28 of the monitor device 23. The monitor screen 29 is provided, for instance, by a liquid crystal panel. Incidentally, though the buttons 30 are integrated with the monitor device 23 in this exemplary embodiment, the buttons may be independent of the monitor device.

[2] Structure of Control System of Hydraulic Excavator 1

Figure 3:
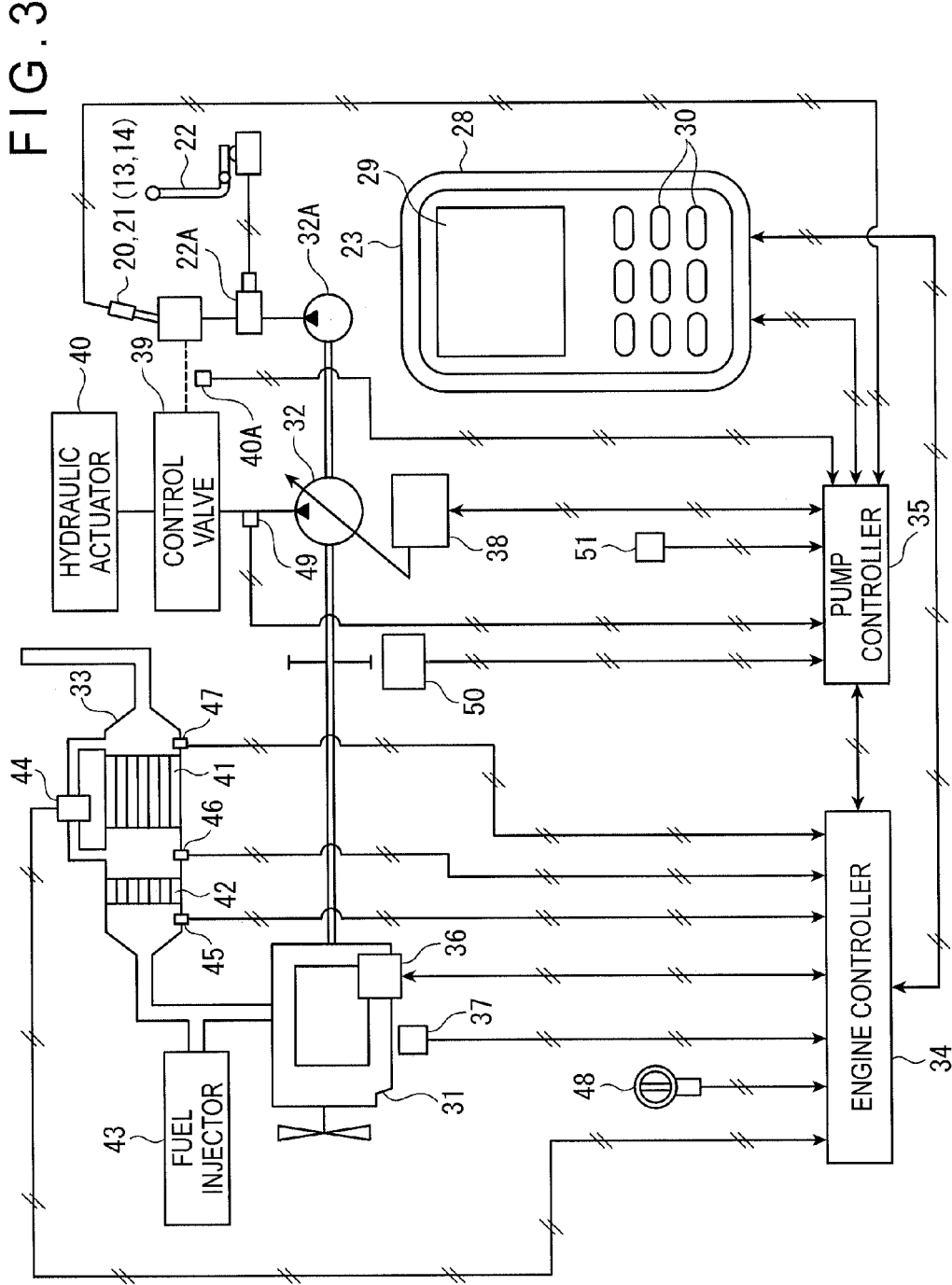
FIG. 3 is a diagram showing a control system of the construction machine of the exemplary embodiment.

FIG. 3 shows a control system of the hydraulic excavator 1.

The control system of the hydraulic excavator 1 controls an engine 31, a hydraulic pump 32 and an exhaust gas purifying device 33. The control system includes an engine controller 34 and a pump controller 35. The monitor device 23, the engine controller 34 and the pump controller 35 are mutually connected in a manner capable of communication via CAN (Controller Area Network).

The engine 31 is a diesel engine driven by a fuel of light oil. The engine 31 includes: a fuel pump 36 with a common rail fuel injection device, the fuel pump 36 pumping fuel to a common rail; and an engine water temperature sensor 37 that detects a water temperature of cooling water of the engine 31. An output shaft of the engine 31 is connected to the hydraulic pump 32.

The hydraulic pump 32 is an axial piston pump that includes a swash plate driven by a swash-plate drive device 38 and adjusts a discharge pressure of the hydraulic fluid according to a rotary position of the swash plate. A hydraulic actuator 40 is connected to a hydraulic-fluid discharge side of the hydraulic pump 32 via a control valve 39. The hydraulic actuator 40 includes a boom cylinder, an arm cylinder, a bucket cylinder, a rotary hydraulic motor, a travel hydraulic motor and the like (all not illustrated).

A hydraulic pump 32A for generating a pilot pressure is connected to the hydraulic pump 32. A discharge side of the hydraulic pump 32A is connected to the control levers 20 and 21 and the drive levers 13 and 14 via a pilot line. When the control lever 20 or 21 or the drive lever 13 or 14 is operated, the discharge pressure of the control valve 39 is changed via the pilot line to drive the hydraulic actuator 40 of the work equipment 5.

A solenoid valve 22A is provided between the hydraulic pump 32A and the control levers 20 and 21 (the drive levers 13 and 14). When the lock lever 22 is operated to a lock-side, the pilot line is blocked by the solenoid valve 22A, so that the hydraulic actuator 40 is disabled even when an operator operates the control levers 20 and 21 and the drive levers 13 and 14.

A pressure sensor 40A detects whether the wok equipment levers 20 and 21 and the drive levers 13 and 14 are operated or not. The pressure sensor 40A may be provided by an analog sensor or an on-off sensor. The pressure sensor 40A is provided, for instance, in the pilot line for transmitting the operation on the control levers 20 and 21 and the drive levers 13 and 14 to the control valve 39. Incidentally, a potentiometer may be installed in the control lever in place of the pressure sensor 40A in order to judge whether the control lever is operated or not.

The exhaust gas purifying device 33 is a device that removes the PM (Particulate Matter) contained in the exhaust gas of the engine 31. The exhaust purifying device 33 includes a filter 41 and an oxidizing catalyst 42.

The filter 41 is made of a ceramic and the like and captures the PM contained in the exhaust gas.

The oxidizing catalyst 42 reduces nitrogen monoxide (NO) among nitrogen oxides (NOx) in the exhaust gas and increases nitrogen dioxide ($NO_2$). The oxidizing catalyst 42 also oxidizes hydrocarbon fed by a fuel injector 43 provided at an upstream of a flow of the exhaust gas relative to the oxidizing catalyst 42 to effect the regeneration process of the filter 41 in which the PM captured by the filter 41 is combusted by a reaction heat generated by the oxidation of the hydrocarbon fed by the fuel injector 43. The hydrocarbon fed by the fuel injector 43 may be, for instance, light oil (i.e. fuel).

Though the fuel injector 43 is provided to an exhaust path between the engine 31 and the oxidizing catalyst 42 in this exemplary embodiment, the fuel may be fed to a combustion chamber of the engine 31 during an exhaust stroke of the engine 31 and unburned fuel may be fed to the exhaust gas purifying device 33 (i.e. post injection).

Further, though the oxidizing catalyst 42 of the exhaust gas purifying device 33 of this exemplary embodiment is provided on an upstream side of the filter 41, the oxidizing catalyst may alternatively be directly held in the filter or, further alternatively, an additional oxidizing catalyst may be disposed on an upstream side of the filter while directly holding the oxidizing catalyst in the filter.

The exhaust gas purifying device 33 includes: a differential pressure sensor 44 for detecting a differential pressure between inlet and outlet sides of the filter 41; and temperature sensors 45, 46 and 47 respectively for detecting the temperatures of an inlet side of the exhaust gas purifying device 33, an inlet side of the filter 41 and an outlet side of the exhaust gas purifying device 33. The detected values detected by the sensors 44 to 47 are outputted to the engine controller 34 in a form of electric signals.

The differential pressure sensor 44 is provided by a single sensor in this exemplary embodiment. However, the differential pressure sensor 44 may alternatively be provided by pressure sensors respectively provided to the inlet and outlet sides of the filter 41, where the pressure values detected by the pressure sensors are outputted to the engine controller 34 in a form of electric signals to obtain the difference between the pressure values.

The engine controller 34 controls an engine speed of the engine 31 in accordance with the engine speed set by a fuel dial 48. The control results of the engine 31, the water temperature detected by the engine water temperature sensor 37 and the like are outputted to the monitor device 23 in a form of electric signals.

Further, the engine controller 34 judges whether the regeneration process of the exhaust gas purifying device 33 should be performed or not based on the electric signals from the differential pressure sensor 44 of the exhaust gas purifying device 33. When it is judged that the regeneration process is necessary, the engine controller 34 initiates the regeneration process of the exhaust gas purifying device 33 upon receipt of an instruction command for starting the regeneration process from an operator (i.e. manual regeneration) or by the engine controller itself (i.e. automatic regeneration), generates a command indicating that the regeneration is in progress and outputs the command to the monitor device 23 in a form of electric signals.

Incidentally, it is judged whether the regeneration process of the filter 41 is necessary or not according to a pressure in this exemplary embodiment. However, a rotation sensor, load sensor and temperature sensor may alternatively be used to calculate a PM discharge amount and PM combustion amount and a PM deposit amount may be calculated as a difference between the PM discharge amount and the PM combustion amount, so that whether the filter 41 is clogged or not and regeneration process is necessary or not can be determined based on accumulation of the PM deposit amount in a time-series manner.

The pump controller 35 controls the swash-plate drive device 38 based on detected values of a pressure sensor 49 for detecting a discharge pressure of the hydraulic pump 32 and an engine speed sensor 50 provided to the output shaft connecting the engine 31 and the hydraulic pump 32. The pump controller 35 generates data indicating whether the control levers 20 and 21 and the drive levers 13 and 14 are operated or not based on the pressure sensor 40A provided to the pilot line and outputs the data to the monitor device 23 in a form of electric signals.

[3] Data Processing Structure of Monitor Device 23

Figure 4:
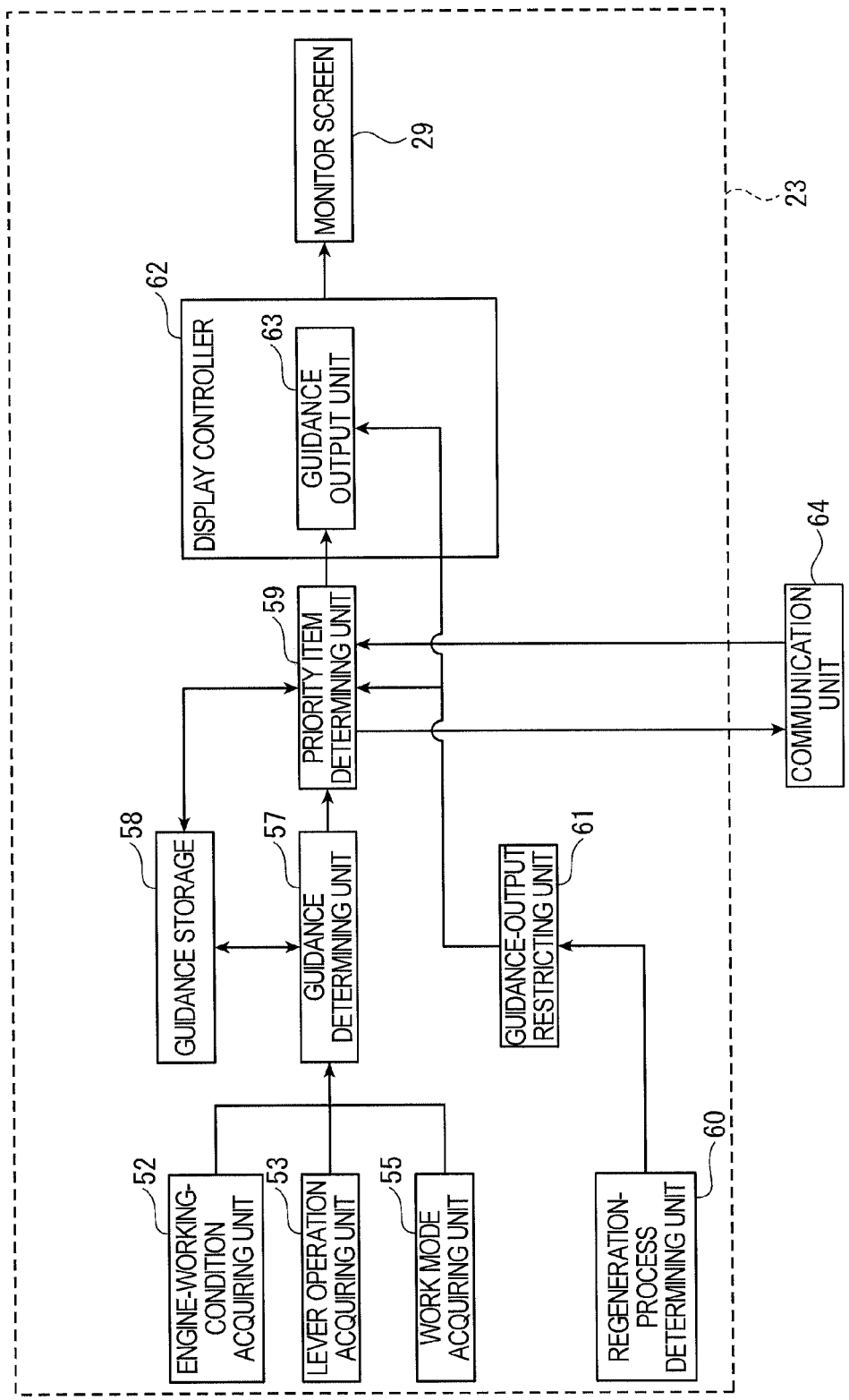
FIG. 4 is a functional block diagram showing a data processing structure in a monitor device of the exemplary embodiment.

FIG. 4 is a functional block diagram showing a data processing structure of the monitor device 23.

The monitor device 23 displays the conditions of the hydraulic excavator 1 on the monitor screen 29 based on the status of the control push buttons 30 and the various detection values outputted from the engine controller 34 and the pump controller 35 via the CAN. The monitor device 23 includes an engine-working-condition acquiring unit 52, a lever operation acquiring unit 53, a work mode acquiring unit 55, a guidance acquiring unit 57, a guidance storage 58, a priority item determining unit 59, a regeneration-process determining unit 60, a guidance-output restricting unit 61, a display controller 62 and a guidance output unit 63.

The engine-working-condition acquiring unit 52 acquires the working condition of the engine 31 based on the various detection values outputted by the engine controller 34.

The lever operation acquiring unit 53 acquires a judgment value outputted by the pump controller 35 indicating whether the levers 20, 21, 13 and 14 are operated or not.

The work mode acquiring unit 55 acquires, for instance, a setting of a work mode switch assigned to each of the buttons 30 provided on the monitor device 23. It should be noted that construction machines including hydraulic excavators in general are provided with a plurality of work modes each representing one of types of basic works with different work loads, such as "P-mode" and "E-mode." The hydraulic excavator effects one of different control operations according to the work mode selected by an operator. The outline of each of the work modes is as follows.

The "P-mode" refers to a work mode for performing a large-load excavation work (emphasizing workload), where the output torque of the engine and the absorption torque of the hydraulic pump are matched in an area with relatively high engine speed and output torque.

The "E-mode" refers to a work mode for performing an excavation work with smaller load than that in the P-mode (emphasizing fuel economy), where engine output torque characteristics lower than those in the P-mode are set.

The guidance determining unit 57 judges whether the hydraulic excavator 1 is in an energy wasting operation or not based on the conditions of the hydraulic excavator 1 acquired by the above-described acquiring units 52, 53 and 55.

Specifically, the guidance determining unit 57 judges whether the hydraulic excavator 1 is in the energy wasting operation or not based on judgment conditions for fuel-consumption-deteriorating operation items stored in the guidance storage 58.

The guidance storage 58 is stored in a memory (not illustrated) provided in the monitor device 23. As shown in FIG. 5, the guidance storage 58 is a database of a table structure in which names of the fuel-consumption-deteriorating operation items, judging conditions for the energy wasting operation, a guidance corresponding to each of the items and a priority of each of the items are associated.

The guidance storage 58 stores, for instance, the following items that are judged to be the energy wasting operations.
(1) Operation-Representing Item Name: Idling for a Long Time "Idling for a long time" refers to a condition in which all of the hydraulic actuators for the work equipment 5 and the like are not operated (all of the levers 13, 14, 20 and 21 are not operated or the lever 22 is operated to lock) consecutively for a predetermined time while the engine 31 is in operation. The lever to be the subject for the judgment may be determined in accordance with the type of the vehicle (e.g. an excavator). However, it is preferable that the work equipment lever is used as the subject for the judgment.
(2) Operation-Representing Item Name: E-Mode Recommendation "E-mode recommendation" refers to a condition in which the work mode switch is not the E-mode but is set at a mode that consumes more fuel, e.g. the P-mode, and the generated power is within the power generatable in the E-mode.

Incidentally, the generated power is obtained by multiplying the values of the engine speed and the engine output torque outputted from the engine controller.

The priority item determining unit 59 determines one of the energy wasting operations for which an energy-saving guidance should be preferentially outputted based on the frequency of the energy wasting operations determined by the guidance determining unit 57 and the priority order of the energy wasting operation stored in the guidance storage 58.

For instance, the priority item determining unit 59 determines that the energy-saving guidance should be preferentially outputted to frequently-occurring one of the energy wasting operations. Incidentally, when the frequencies of some of the energy wasting operations are the same, one of the energy wasting operations with the highest priority is outputted. The frequency per one day or the frequency while the vehicle is keyed on (i.e. a key-on state) is used as the frequency of operations to be used for the comparison according to the setting. For instance, with the frequency during the key-on state being referenced, when it is a rule to key on the vehicle each time an operator is changed, an appropriate guidance can be selected for the operator currently operating the vehicle. Further, with the use of an ID key or a password input with which an operator can be identified, an appropriate guidance for an operation for the specified operator can be selected.

Incidentally, the priority item determining unit 59 may determine an energy wasting operation for which an energy-saving guidance should be preferentially outputted based on the frequency of the energy wasting operations outputted by the guidance determining unit 57 and average information outputted by a communication unit 64 described below.

The average information is information on an average frequency of the energy wasting operations for the same type of hydraulic excavator 1, wheel loader and the like. For instance, the average information may be an inverse number of an average value of the frequency of the energy wasting operations occurred in the same type of construction machines.

When the average information is the inverse number of the average values of the frequency occurred in the same type of construction machines, the priority item determining unit 59 multiplies the frequency of each of the energy wasting operations outputted by the guidance determining unit 57 and the inverse number of the average value corresponding to each of the energy wasting operations. The priority item determining unit 59 determines that a guidance for the energy wasting operation with the largest result of the multiplication should be preferentially outputted.

At this time, since the guidance to be preferentially outputted can be determined considering an operating condition in the other construction machines (i.e. the guidance to be outputted is not determined by simply comparing the frequency of the plurality of energy wasting operations), it can be determined that the guidance for an energy wasting operation that is more frequently occurred than in the other construction machines should be preferentially outputted.

The priority item determining unit 59 outputs a signal indicating an excellent operation to the guidance output unit 63 when the frequency of the occurrence of each of the energy wasting operations is zero. In this exemplary embodiment, the priority item determining unit 59 outputs a signal indicating an excellent operation to the guidance output unit 63 when the operation time reaches or exceeds a predetermined time (e.g. an hour) and the frequency of the occurrence of each of the energy wasting operation is zero. Since the operation time reaching or exceeding the predetermined time is required, a notification indicating an excellent operation is not outputted in an extremely short time of operation in which the energy wasting operation hardly occurs.

Further, the priority item determining unit 59 outputs operation information including the frequency for each of the energy wasting operations to the communication unit 64.

The regeneration-process determining unit 60 determines that a regeneration process is in progress in the exhaust gas purifying device 33 when an electric signal indicating that the exhaust gas purifying device 33 is under a regeneration process is received from the engine controller 34.

The guidance-output restricting unit 61 restricts the guidance determined to be displayed by the priority item determining unit 59 from being displayed on the monitor screen 29 (i.e. disables the guidance display) when it is determined by the regeneration-process determining unit 60 that the regeneration process is in progress in the filter 41.

Further, the guidance-output restricting unit 61 also restricts the priority item determining unit 59 from adding the frequency for corresponding items of the energy wasting operations when it is determined by the regeneration-process determining unit 60 that the regeneration process is in progress in the filter 41.

The display controller 62 displays various information indicating the working condition of the hydraulic excavator 1 on the monitor screen 29. The display controller 62 includes the guidance output unit 63.

The guidance output unit 63 displays the guidance determined by the priority item determining unit 59 on the monitor screen 29. The guidance determined by the guidance output unit 63 is displayed only when it is determined by the guidance determining unit 57 that the machine is under energy wasting operation.

Further, even when the hydraulic excavator 1 is keyed off, the guidance output unit 63 is configured to display on the monitor screen 29 the most frequent one of the energy wasting operation items counted by the priority item determining unit 59 for one day as a one-point guidance for a predetermined time. For instance, when the idling for a long time is the item most frequently occurred, a message that "frequent idling stop reduces fuel consumption" is displayed. At this time, electric power is kept being supplied to an operating part (e.g. the monitor device) from a key-off operation to the end of displaying. As an arrangement for keeping the supply of electric power (electric-power keeping unit), a control unit for controlling a relay so as not to cut off the power supply from a battery until the display is ended may be provided. Alternatively, another battery for supplying electric power necessary for completely displaying the message after the power supply from a main battery is stopped may be provided.

The communication unit 64 receives various operation information determined by the priority item determining unit 59 and transmits the various operation information to the management server 67 via a communication line such as a satellite communication. Specifically, the communication unit 64 includes a communication processing unit 65 and a transmitter/receiver 66 as shown in FIG. 6. Though not shown, the communication unit 64 is provided inside the vehicle of the hydraulic excavator 1 and is connected with the monitor device 23 in a manner capable of communication via the CAN.

The communication processing unit 65 associates the various operation information received from the priority item determining unit 59 with identification information of the hydraulic excavator 1, identification information of an operator and the like before outputting the associated information to the transmitter/receiver 66.

The transmitter/receiver 66 transmits the various operation information received from the communication processing unit 65 to the management server 67.

The transmitter/receiver 66 also receives the operation information transmitted from the management server 67 and outputs the operation information to the communication processing unit 65.

The communication processing unit 65 outputs the information received from the transmitter/receiver 66 to the priority item determining unit 59.

The management server 67 aggregates and stores the various operation information sent from the construction machines other than the hydraulic excavator 1. The management server 67 includes a transmitter/receiver 68, a communication processing unit 69, an aggregation processing unit 70, an aggregation database 71 and a publication processing unit 72.

The transmitter/receiver 68 receives the operation information from the hydraulic excavator 1 and outputs the information to the communication processing unit 69.

The communication processing unit 69 outputs the operation information received from the transmitter/receiver 68 to the aggregation processing unit 70 after converting into a predetermined format.

The aggregation processing unit 70 stores the operation information received from the communication processing unit 69 in the aggregation database 71. Further, the aggregation processing unit 70 calculates information on the average frequency of each of the energy wasting operations in the same type of hydraulic excavator 1 (e.g. inverse number of the average frequency) based on the information stored in the aggregation database 71 and outputs the information to the communication processing unit 69.

The aggregation results are transmitted from the communication processing unit 69 to the hydraulic excavator 1 via the transmitter/receiver 68.

Further, the aggregation processing unit 70 transmits an optional message to be displayed in the hydraulic excavator 1 via the communication processing unit 69 based on the aggregated operation information when a predetermined condition is satisfied.

For instance, when the frequency of the energy wasting operations indicated by the operation information is less than (i.e. superior to) that in the same type of hydraulic excavator 1, the aggregation processing unit 70 transmits a message indicating that the operation is excellent to the hydraulic excavator 1.

Further, the aggregation processing unit 70 is adapted to transmit data such as a graphic, color and sound via the communication processing unit 69 in addition to the optional message transmitted from the management server 67 to the vehicle to be displayed on the monitor device 23 in the hydraulic excavator 1.

The aggregation database 71 stores the operation information received from the plurality of hydraulic excavators 1.

The publication processing unit 72 generates various WEB pages 73 based on the information in the aggregation database 71 and publishes the WEB pages 73 in a browsable manner.

The publication processing unit 72 generates the WEB page 73 so as to include, for instance, the average frequency of each of the energy wasting operations in the same type of hydraulic excavator 1 and a rank of the frequency of the energy wasting operations for each of the hydraulic excavators 1.

[4] Display on Monitor Screen 29 and Regeneration Process of Exhaust Gas Purifying Device 33

Next, a standard screen G1 displayed on the monitor screen 29 of the monitor device 23 will be described below with reference to FIG. 7.

Figure 7:
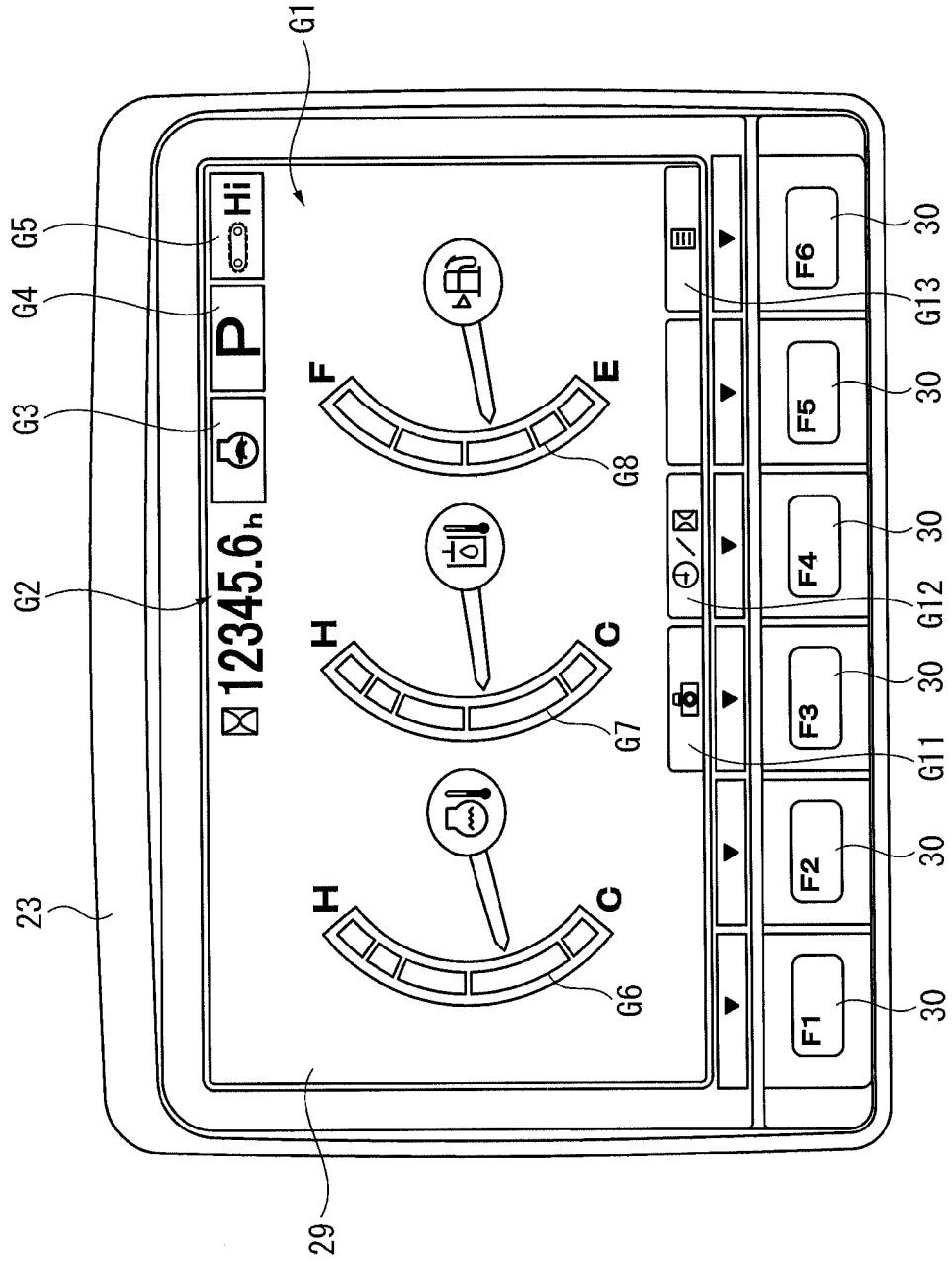
FIG. 7 is a schematic illustration of an example of a screen displayed on the monitor device of the exemplary embodiment.

As shown in FIG. 7, a sign G2 ("12345.6 h") displayed at the center of the standard screen G1 represents a cumulative operating time of the hydraulic excavator 1. A sign G3 on the right of the sign G2 represents an operating condition of an automatic deceleration function. A sign G4 on the right of the sign G3 represents an operation mode selected by an operator. A sign G5 on the upper rightmost side represents a setting mode of a travel speed of the hydraulic excavator 1 set by an operator.

Next, a sign G6 in the middle area represents an engine water temperature meter indicating a temperature of a cooling water of the engine 31 detected by the engine water temperature sensor 37. A sign G7 in the middle area represents a hydraulic fluid temperature meter indicating a temperature of a hydraulic fluid detected by the hydraulic fluid temperature sensor 51. A sign G8 in the middle area represents a fuel gauge indicating a fuel level of the engine 31. Incidentally, though the standard screen G1 may be designed in any manner as long as at least the engine water temperature meter and the fuel gauge are simultaneously displayed, the cumulative operating time may preferably be displayed.

Signs on the lower area each represent a function of buttons 30 (F1 to F6) located thereunder. A sign G11 represents a screen-switching function to an image taken by a camera provided on a rear side of the hydraulic excavator 1. A sign G12 represents a switching function of the sign G2 (from the cumulative operating time to a timepiece and from the timepiece to the cumulative operating time). A sign G13 represents a switching function to a menu screen.

A button F6 under a sign G13 is also used for the setting of the regeneration process of the exhaust gas purifying device 33.

Specifically, when the engine controller 34 detects that the regeneration process of the exhaust gas purifying device 33 is necessary while operating the hydraulic excavator 1, the engine controller 33 outputs a command to the effect to the engine-working-condition acquiring unit 52 of the monitor device 23.

Figure 8:
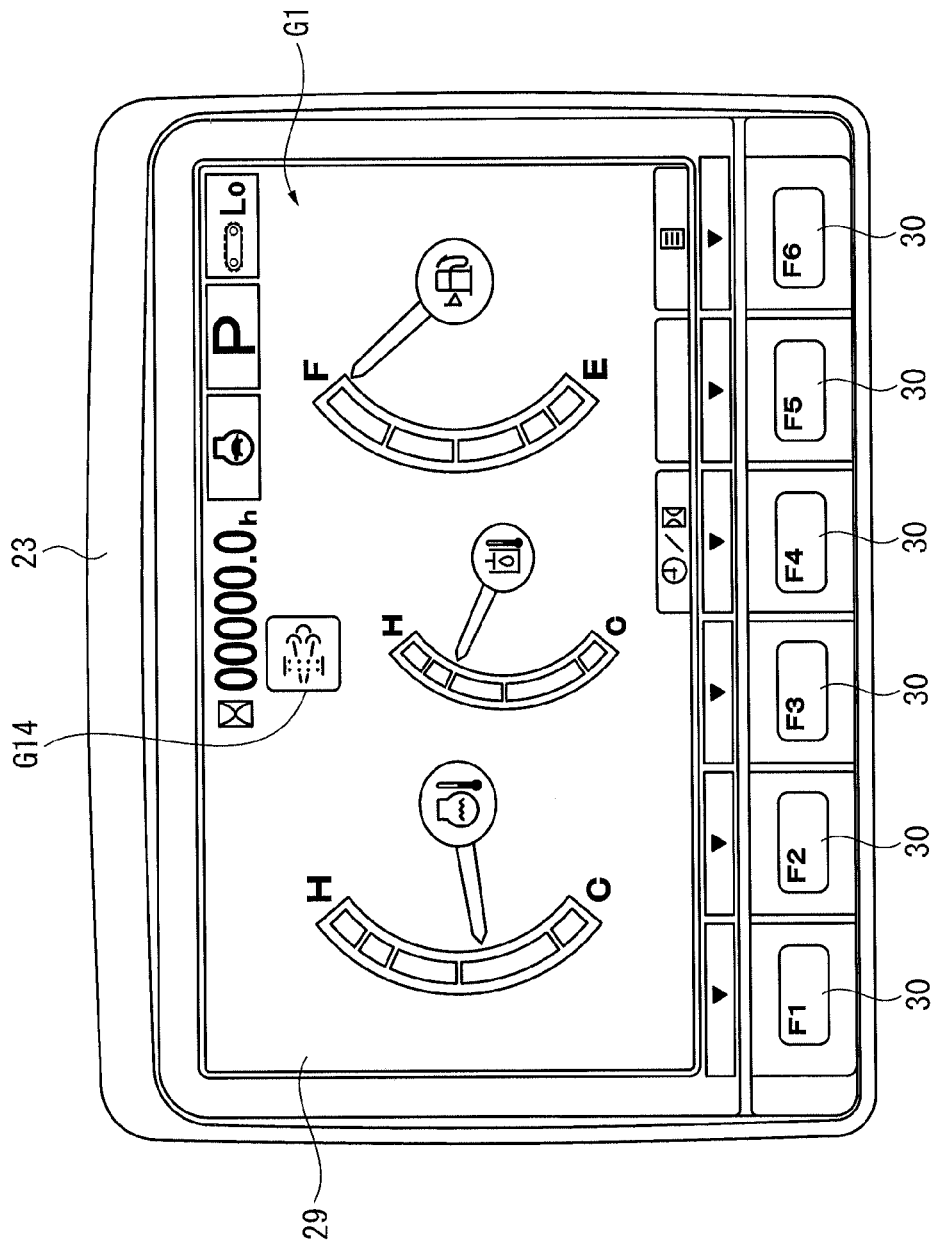
FIG. 8 is another schematic illustration of an example of a screen displayed on the monitor device of the exemplary embodiment.

Based on the information acquired by the engine-working-condition acquiring unit 52, the monitor device 23 displays a sign G14 prompting the regeneration process of the exhaust gas purifying device 33 on the screen G1 as shown in FIG. 8.

The operator of the hydraulic excavator 1 having recognized the sign G14 stops the hydraulic excavator 1 on a flat ground. Then, the operator sets the engine 31 at a predetermined engine speed (e.g. at a low idling state) by not touching the levers 20, 21, 13 and 14 for the working equipment and the like or by operating the lock lever 22 to a lock side.

Figure 9:
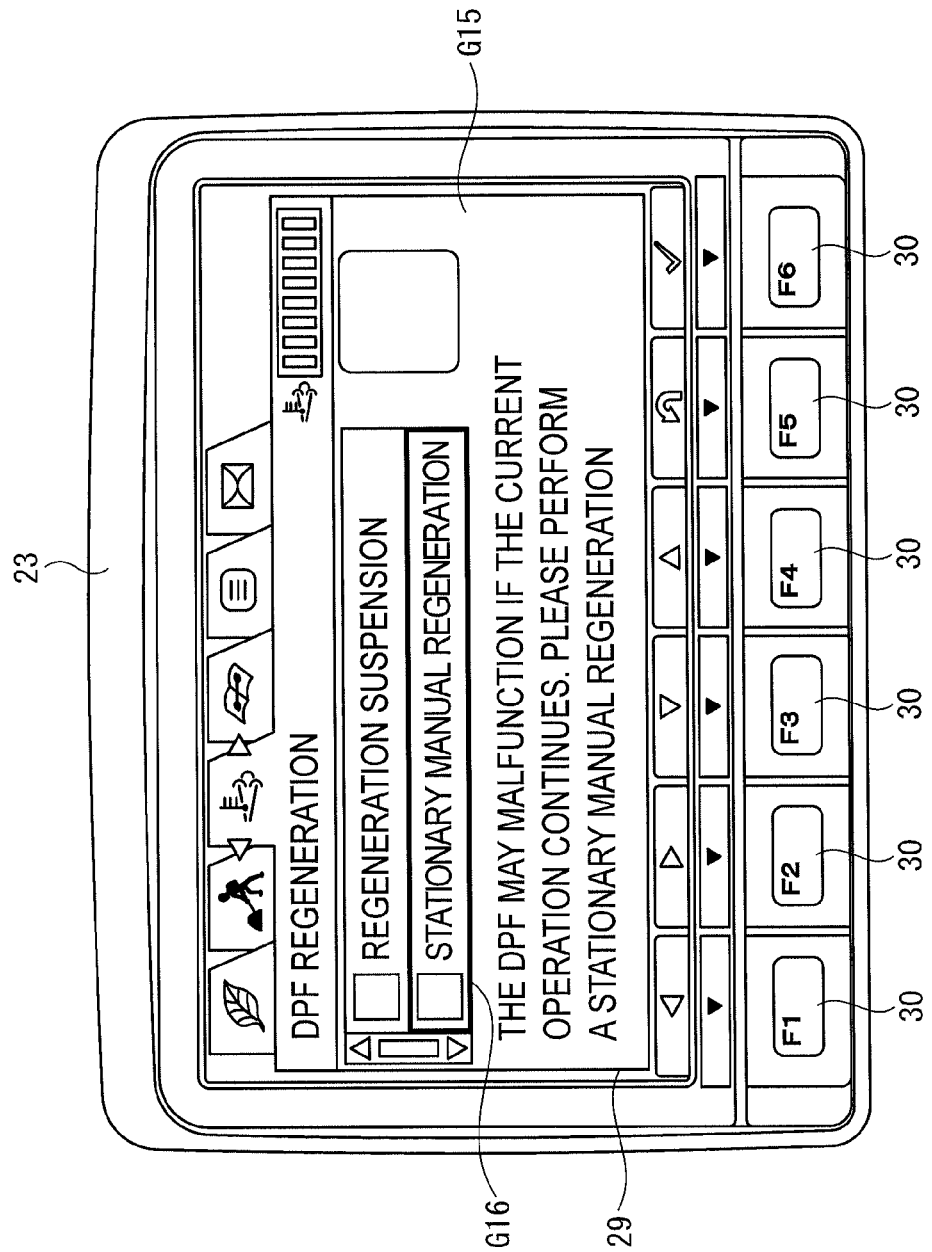
FIG. 9 is still another schematic illustration of an example of a screen displayed on the monitor device of the exemplary embodiment.

Next, the operator presses the "F6" button 30 to switch the monitor screen 29 to a display screen G15 shown in FIG. 9. After confirming that "stationary manual regeneration" is selected by a cursor, the operator pushes the "F6" button 30 to start the regeneration process of the exhaust gas purifying device 33.

Figure 10:
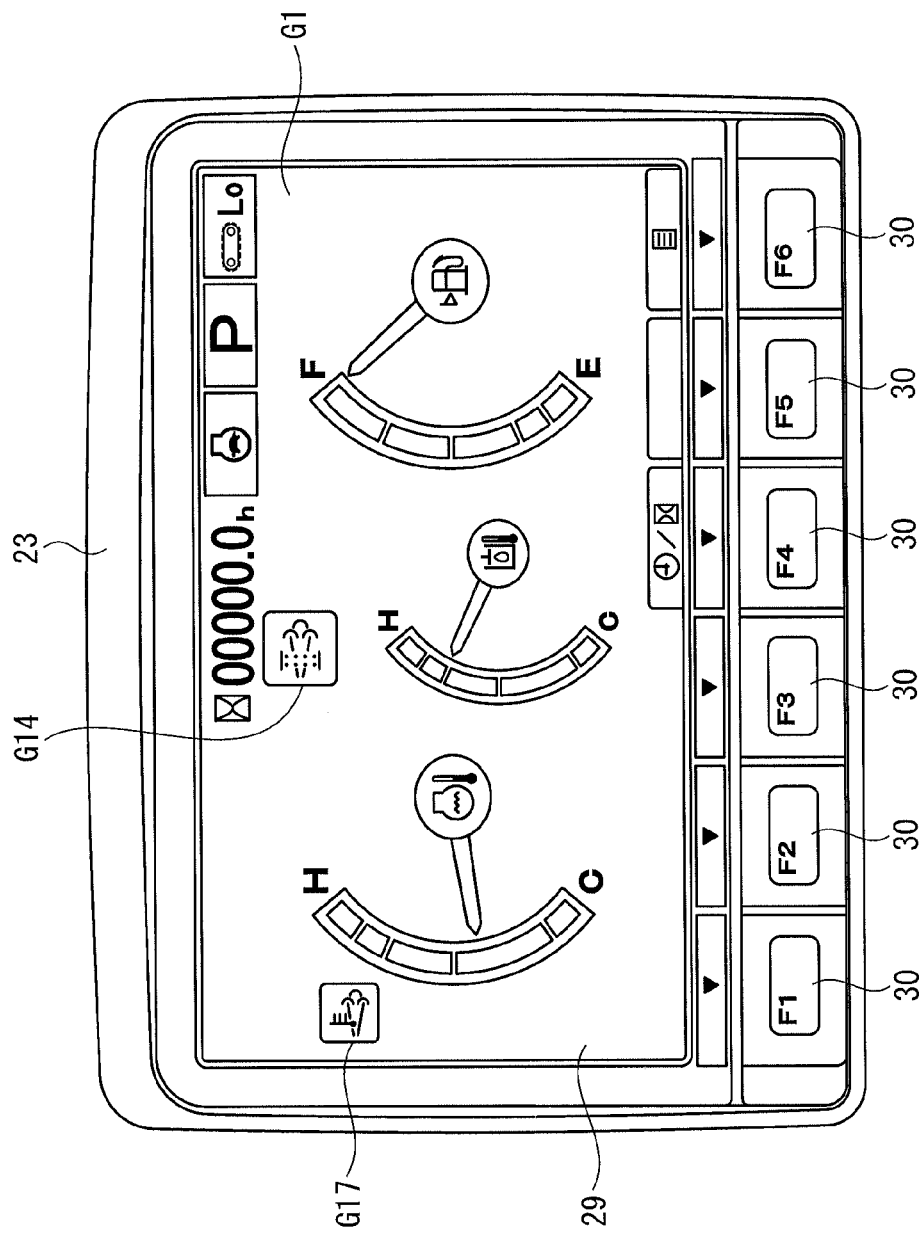
FIG. 10 is a further schematic illustration of an example of a screen displayed on the monitor device of the exemplary embodiment.

When the regeneration process of the exhaust gas purifying device 33 is initiated, a sign G17 indicating that the regeneration process is in progress is displayed on an upper left of the screen G1 showing the operating condition in addition to the sign G14 for promoting the regeneration process as shown in FIG. 10.

When the regeneration process of the exhaust gas purifying device 33 is terminated, a message indicating that the regeneration process is ended is displayed on the screen to notify the end of the regeneration process to the operator. Incidentally, when the regeneration process is to be suspended, the cursor is moved to "stop regeneration" on the display screen G15 in FIG. 9 to stop the regeneration process.

[5] Operation of Exemplary Embodiment

Figure 11:
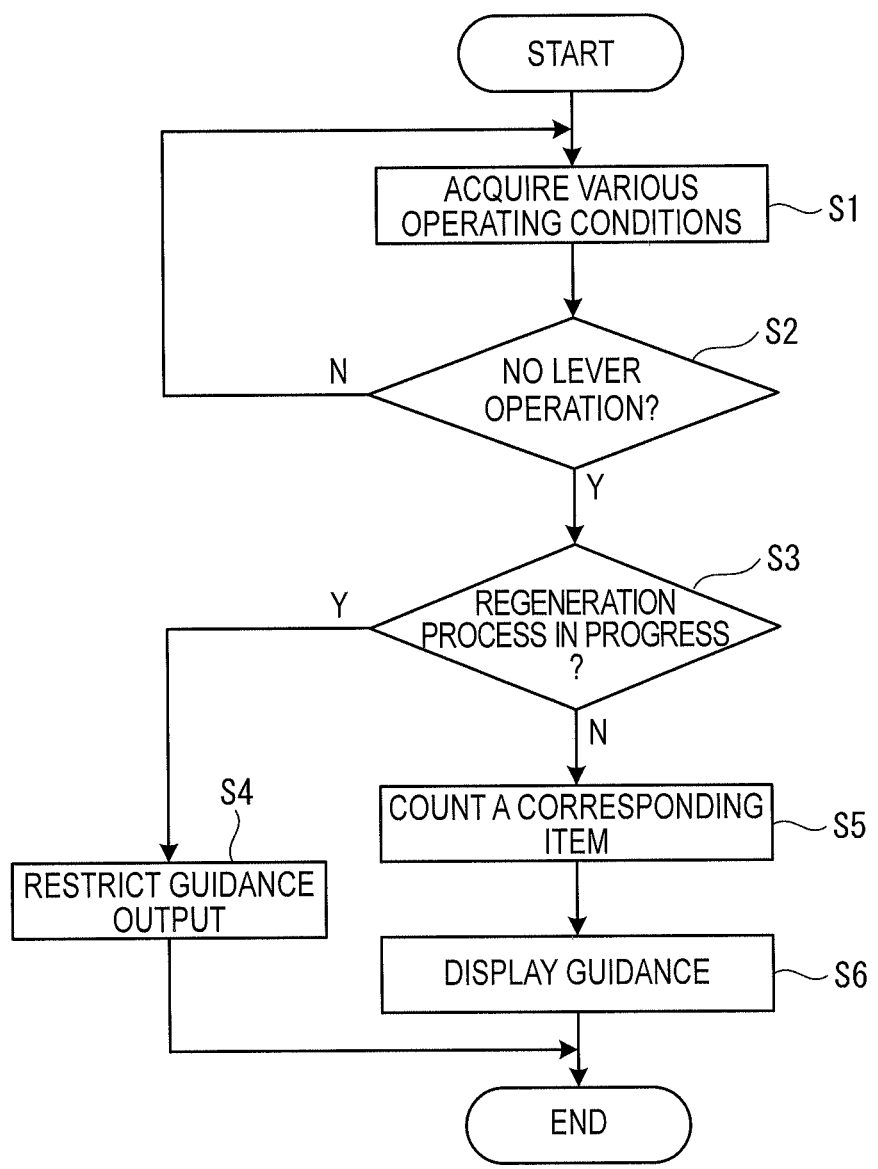
FIG. 11 is a flowchart showing an operation of the exemplary embodiment.

An operation of the above monitor device 23 (guidance output device) will be described below with reference to FIGS. 11 to 13.

(1) Guidance Display While Hydraulic Excavator 1 is in Operation

Initially, the engine-working-condition acquiring unit 52, lever operation acquiring unit 53 and work mode acquiring unit 55 acquire the various operating conditions from the engine controller 34 and the pump controller 35 (Step S1).

Next, the lever operation acquiring unit 53 acquires the operating conditions of the levers 20, 21, 13 and 14 to determine whether the levers are not operated consecutively for a predetermined time (Step S2).

When one of the levers is operated within the predetermined time, the process goes back to Step S1.

On the other hand, when the levers are not operated consecutively for the predetermined time, the regeneration-process determining unit 60 judges whether an input indicating that the regeneration process is in progress has been received from the engine controller 34 or not (Step S3).

When it is judged that a signal input indicating that the regeneration process is in progress has been received from the engine controller 34, the guidance-output restricting unit 61 clears a counter for counting a preset time for the corresponding items to be judged by the priority item determining unit 59, restricts (disables) the display of the guidance by the guidance output unit 63 on the monitor screen 29 and returns to Step S1 (Step S4). Incidentally, since the counter for counting the elapsed time is cleared during the regeneration process, the counting of the time can be started upon the termination of the regeneration process of the exhaust gas purifying device 33, so that the guidance is not displayed immediately after the termination of the regeneration process.

When it is judged that the signal input indicating that the regeneration process is in progress in the exhaust gas purifying device 33 is not received, the priority item determining unit 59 adds frequency of the item "idling for a long time" in the energy wasting operations stored in the guidance storage 58 and stores the frequency in a memory (Step S5).

Figure 12:
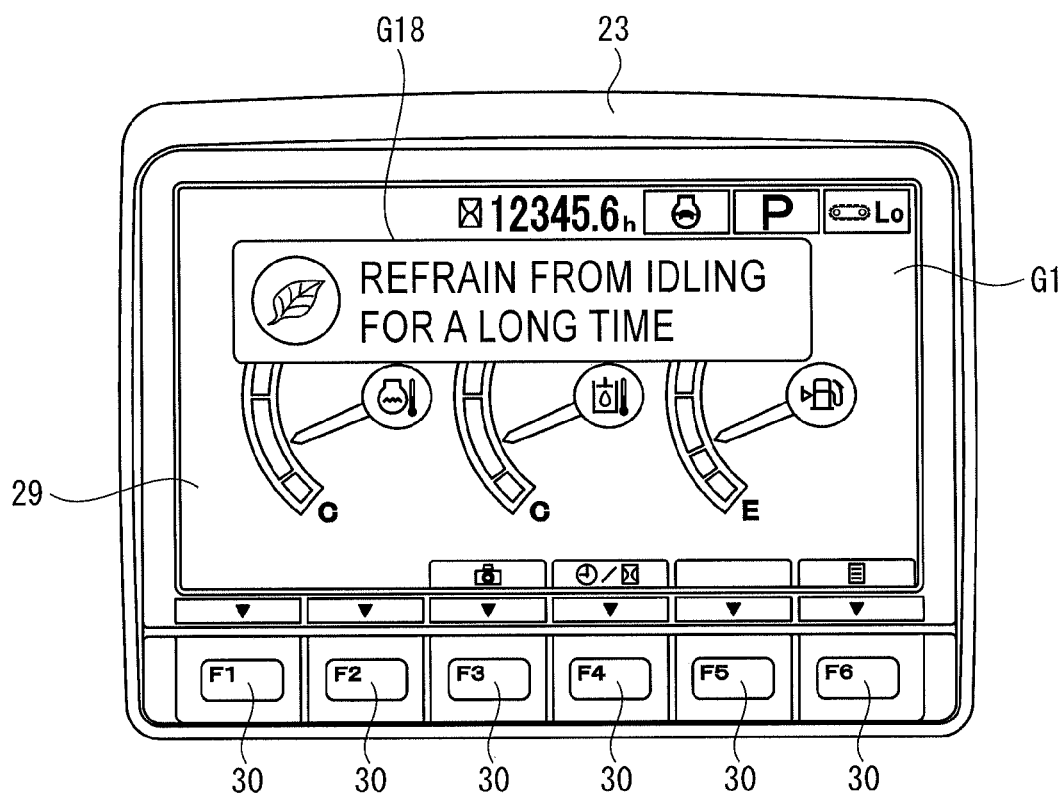
FIG. 12 is a still further schematic illustration of an example of a screen displayed on the monitor device of the exemplary embodiment.

The guidance output unit 63 displays a sign G18 indicating "refrain from idling for a long time" on the screen G1 of the monitor screen 29 as shown in FIG. 12 (Step S6).

It should be noted that, though the guidance output is restricted when the "idling for a long time" occurs, the guidance output may be restricted under different conditions. For instance, when the work mode acquired by the work mode acquiring unit 55 is a work mode with larger fuel consumption (e.g. the "P-mode") than that in the "E-mode", the guidance is displayed according to the determining conditions of the above-described "E-mode recommendation" item (see FIG. 5) by the guidance determining unit 57. This is because, since the hydraulic excavator 1 is in an idling state during the regeneration process of the exhaust gas purifying device 33, the "E-mode" setting is appropriate. When the regeneration process is in progress in such an exemplary embodiment, the guidance output may be restricted by the guidance-output restricting unit 61. Incidentally, in the above arrangement, the work mode may preferably be automatically switched from the "P-mode" to the "E-mode."

(2) Guidance Display When Work of Hydraulic Excavator 1 is Ended

Figure 13:
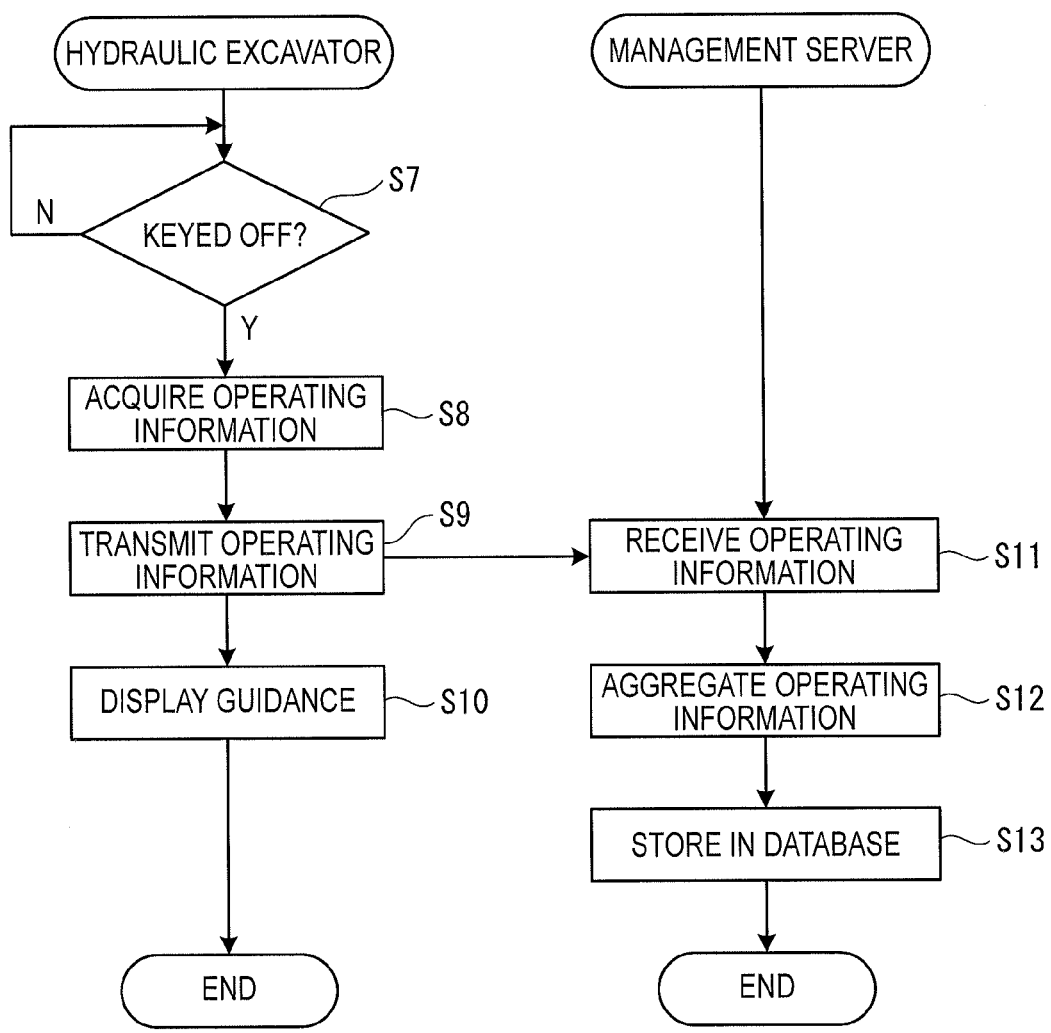
FIG. 13 is another flowchart showing an operation of the exemplary embodiment.

When the work by the hydraulic excavator 1 is ended, the engine-working-condition acquiring unit 52 monitors an on/off state of the key of the hydraulic excavator 1 as shown in FIG. 13 (Step S7). When it is judged that the engine key of the hydraulic excavator 1 is turned off, the priority item determining unit 59 acquires the operating information on the frequency of the energy wasting operations on that date and outputs to the communication unit 64 while associating with the identification information of the hydraulic excavator 1 and the operator (Step S8).

Incidentally, since the frequency of the item (e.g. "idling for a long time") that is judged to be an energy wasting operation by the guidance determining unit 57 during the regeneration process of the exhaust gas purifying device 33 is not counted by the priority item determining unit 59 during the regeneration process, an inappropriate frequency is not outputted to the management server 67.

The transmitter/receiver 66 of the communication unit 64 transmits the operation information to the management server 67 via a communication satellite (Step S9).

The guidance output unit 63 displays on the monitor screen 29 the guidance corresponding to the energy wasting operation that is the most frequently counted by the priority item determining unit 59 and terminates the process (Step S10).

When the transmitter/receiver 68 of the management server 67 receives the operation information (Step S11), the communication processing unit 69 outputs the operation information to the aggregation processing unit 70 after converting the received operation information into a predetermined format.

The aggregation processing unit 70 aggregates the received operation information (Step S12) and stores the aggregation results in the aggregation database 71 (Step S13).

(3) Guidance Display When Hydraulic Excavator 1 Starts Operation

Figure 14:
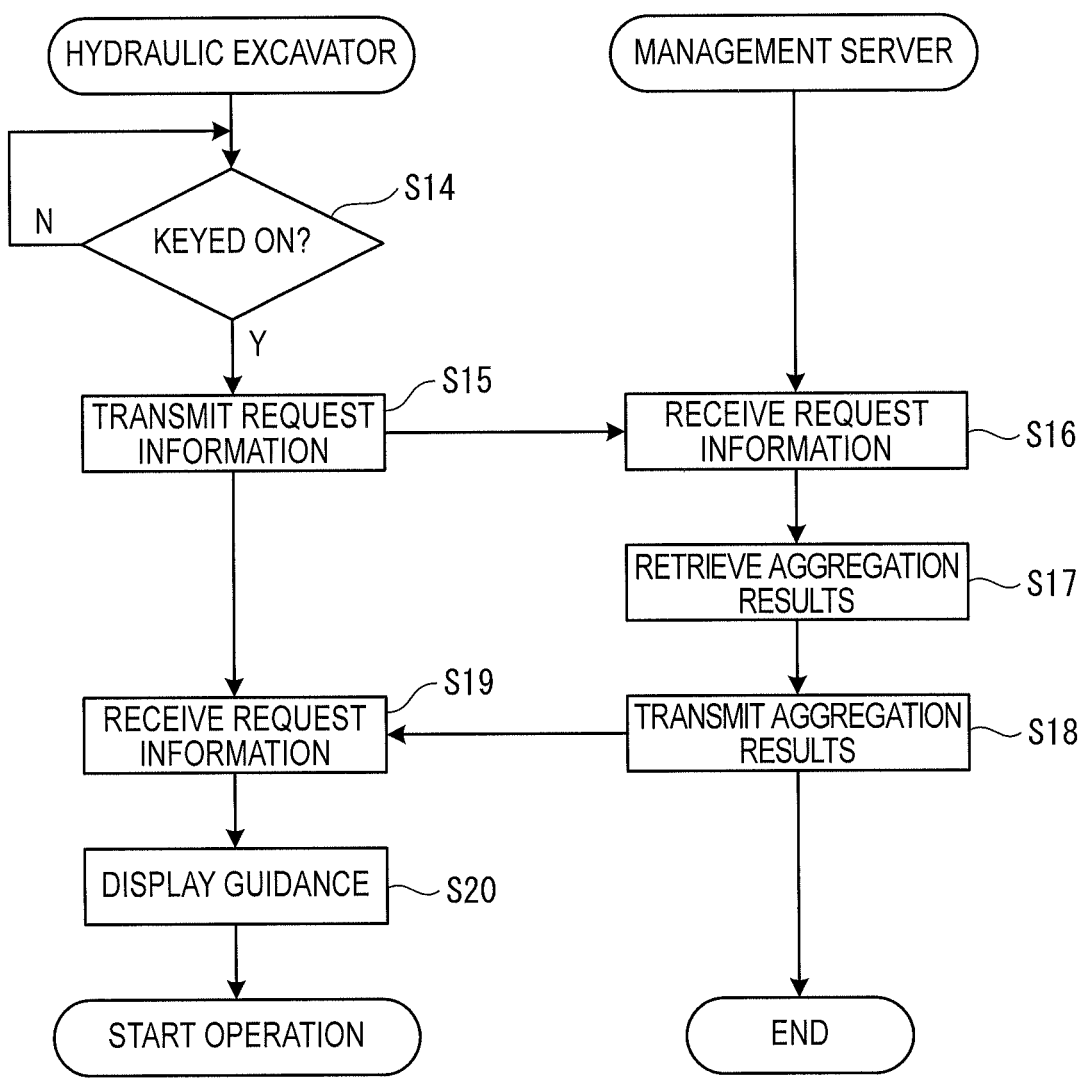
FIG. 14 is still another flowchart showing an operation of the exemplary embodiment.
Figure 15:
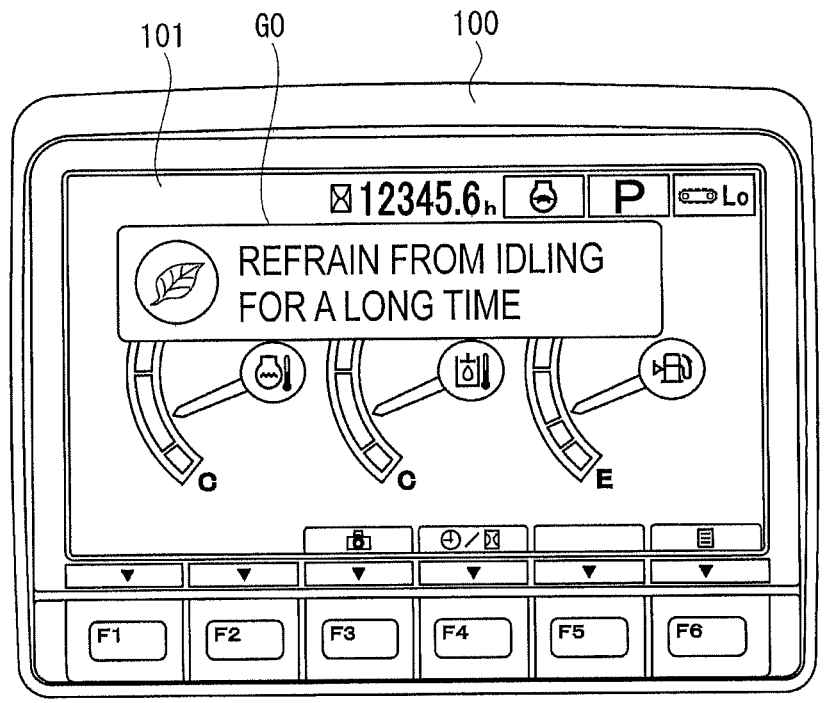
FIG. 15 is a schematic illustration of an example of a screen in a related art on which a guidance is displayed.

When the work by the hydraulic excavator 1 is started, the engine key of the hydraulic excavator 1 is turned on (Step S14) as shown in FIG. 14. Then, the priority item determining unit 59 of the monitor device 23 generates request information for the aggregation results based on the identification information of the hydraulic excavator 1 and the operator and transmits the request information to the management server 67 via the communication unit 64 (Step S15).

When the management server 67 receives the request information (Step S16), the aggregation processing unit 70 searches the aggregation database 71 and retrieves the aggregation results corresponding to the request information (Step S17).

The communication processing unit 69 transmits the retrieved aggregation results to the communication unit 64 of the hydraulic excavator 1 (Step S18).

When the communication unit 64 of the hydraulic excavator 1 receives the aggregation results (Step S19), the priority item determining unit 59 stores the aggregation results in the memory in the monitor device 23 and extracts one of the most frequent energy wasting operations. Then, the guidance output unit 63 displays the guidance corresponding to the extracted one of the energy wasting operations on the monitor screen 29 (Step S20).

[6] Advantage of Exemplary Embodiment

According to the above exemplary embodiment, the following advantages can be obtained.

Since the monitor device 23 includes the regeneration-process determining unit 60 and the guidance-output restricting unit 61, even when the guidance determining unit 57 judges that "idling for a long time" occurred, a guidance prompting stopping the engine (i.e. "refrain from idling for a long time") for improving the fuel economy is not displayed during the regeneration process of the exhaust gas purifying device 33, so that outputting of unnecessary guidance for improving the fuel economy can be avoided.

In other words, without the guidance-output restricting unit 61, a guidance for "idling for a long time" is displayed even when the regeneration process of the exhaust gas purifying device 33 is performed in accordance with the display screen G14 shown in FIG. 8, causing an uncomfortable feeling to an operator.

Further, when such a guidance for "idling for a long time" is displayed during the regeneration process, the operator may erroneously stop the engine 31 (i.e. an erroneous operation may be caused).

Since the regeneration process of an exhaust gas purifying device is performed for a long time, when the guidance for "idling for a long time" is continuously displayed during the regeneration process, the sign G6 of the engine water temperature meter or the sign G8 of the fuel gauge may be hidden by the sign G18 shown in FIG. 12 and the like, so that the change in the value displayed in the gauges (e.g. rise in temperature and decrease in remaining fuel level) becomes less easily recognizable by an operator. Especially, since the temperature of the exhaust gas purifying device 33 becomes as high as approximately 600 degrees C. during the regeneration process, the regeneration process is likely to cause malfunction of the engine 31. Further, a large amount of fuel is required for the regeneration process lasting for a long time. According to the exemplary embodiment, the above disadvantages can be avoided.

In the exemplary embodiment, the guidance storage 58 includes a plurality of guidance items and a frequently occurring item is preferentially displayed. Accordingly, without the regeneration-process determining unit 60 and the guidance-output restricting unit 61, the priority may become inappropriate for erroneously counting the guidance item when an incident that essentially does not fall under the guidance item of which improvement is to be prompted occurs (e.g. during the regeneration process of the exhaust gas purifying device 33), so that a guidance in accordance with an appropriate guidance item cannot be displayed. According to the exemplary embodiment, the above situation can also be avoided.

Further, since the guidance-output restricting unit 61 simultaneously clears the counter for the energy wasting operation in the priority item determining unit 59, the idling state during the regeneration process of the exhaust gas purifying device 33 is not erroneously stored as the energy wasting operation and further is not transmitted to the management server 67. Thus, the management server 67 does not erroneously store the idling during the regeneration process of the exhaust gas purifying device 33 as the energy wasting operation, so that further correct aggregation data can be accumulated.

[7] Modifications

Incidentally, the scope of the invention is not limited to the above-described exemplary embodiment, but includes modifications and improvements as long as such modifications and improvements are compatible with an object of the invention.

Though the invention is applied to the hydraulic excavator 1 in the exemplary embodiment, the invention may alternatively be applied to other construction machines installed with an exhaust purifying device such as a wheel loader and a bulldozer.

Though the guidance output device is provided by a monitor device in which a guidance is displayed on the monitor screen 29, the guidance may be outputted in a different manner and the invention may be applied to different output device such as a sound-outputting or radio output device.

Though the guidance is outputted so that a part of the standard screen G1 shown in FIG. 12 is hidden in the exemplary embodiment, the guidance may be outputted in a different manner. For instance, the guidance may be outputted at a position not to hide the displayed items on the standard screen G1. Further, the guidance is not limited to a message of a character and the like, but may alternatively be a mark displayed in colors changing in a stepwise manner or a bar display and the like for prompting an improvement in the fuel economy.

The invention claimed is:

1. A construction machine, comprising:
an exhaust gas purifying device for an internal combustion engine; and
a guidance output device that outputs a guidance for energy saving of the internal combustion engine provided in the construction machine, the guidance output device comprising:
a guidance storage that stores the guidance for energy saving corresponding to an energy wasting operation of the construction machine,
an occurrence detector that detects an occurrence of the energy wasting operation while the construction machine is operated,
a guidance output unit that outputs the guidance for energy saving corresponding to the energy wasting operation when the energy wasting operation is detected by the occurrence detector,
a status detector that detects a status of the exhaust gas purifying device,
a regeneration process determining unit that determines whether a regeneration process of the exhaust gas purifying device is in progress or not, and
a guidance output restricting unit that restricts an output of the guidance for energy saving by the guidance output unit when the regeneration process determining unit determines that the regeneration process of the exhaust gas purifying device is in progress.

2. The construction machine according to claim 1, further comprising:
an operation detector that detects an operation of an operating unit for operating a work equipment of the construction machine, wherein
the guidance output unit outputs the guidance judging that the construction machine is in the energy wasting operation when it is determined by the operation detector while the engine of the construction machine is in operation that the operating unit is not operated for a predetermined time or the operation unit is locked.

3. The construction machine according to claim 1, wherein the guidance output restricting unit restricts the output of the guidance for energy saving when the exhaust gas purifying device is manually operated to perform the regeneration process.

4. The construction machine according to claim 1, wherein the guidance output unit displays the guidance on a display provided to the construction machine, and
the guidance output unit displays on the display that the regeneration process is in progress during the regeneration process of the exhaust gas purifying device.

5. The construction machine according to claim 1, wherein the guidance output unit comprises a timer that counts a time from starting the energy wasting operation detected by the occurrence detector and an output unit that outputs the guidance when the time counted by the timer exceeds a predetermined time, and
the guidance output restricting unit clears the elapsed time counted by the timer during the regeneration process along with restricting the output of the guidance by the guidance output unit.

6. The construction machine according to claim 1, wherein the guidance storage stores a plurality of items for the guidance.

7. The construction machine according to claim 6, wherein the guidance that is restricted from being outputted by the guidance output restricting unit is a guidance that prompts to stop an engine.

8. The construction machine according to claim 7, further comprising:
a priority item determining unit that determines the energy wasting operation for which the guidance for energy saving is to be preferentially outputted based on a frequency of the energy wasting operation and a priority order of the energy wasting operation stored in the guidance storage.

9. A construction machine, comprising:
an exhaust gas purifying device for an internal combustion engine; and
a guidance output device that outputs a guidance for energy saving of the internal combustion engine provided in the construction machine, the guidance output device comprising:
a guidance storage that stores a plurality of the guidance for energy saving corresponding to an energy wasting operation of the construction machine;
an occurrence detector that detects an occurrence of the energy wasting operation while the construction machine is operated;
a guidance output unit that outputs the guidance for energy saving corresponding to the energy wasting operation when the energy wasting operation is detected by the occurrence detector;
a status detector that detects a status of the exhaust gas purifying device;
a regeneration process determining unit that determines whether a regeneration process of the exhaust gas purifying device is in progress or not;
a guidance output restricting unit that restricts the output of the guidance for energy saving by the guidance output unit when the regeneration process determining unit determines that the regeneration process of the exhaust gas purifying device is in progress; and
a priority item determining unit that determines the energy wasting operation for which the guidance for energy saving is to be preferentially outputted based on a frequency of the energy wasting operation and a priority order of the energy wasting operation stored in the guidance storage, wherein
the guidance of which output is restricted by the guidance output restricting unit is a guidance that prompts to stop an engine, and
the guidance output restricting unit restricts the output of the guidance for energy saving when the exhaust gas purifying device is manually operated to perform the regeneration process.

10. A method for displaying a guidance for energy saving of an internal combustion engine provided in a construction machine comprising an exhaust gas purifying device for the internal combustion engine, the displaying method comprising:
storing in advance the guidance for energy saving corresponding to an energy wasting operation of the construction machine;
detecting an occurrence of the energy wasting operation while the construction machine is operated;
outputting the guidance for energy saving corresponding to the energy wasting operation when the energy wasting operation is detected in the detecting of the occurrence;
detecting a status of the exhaust gas purifying device;

determining whether a regeneration process of the exhaust gas purifying device is in progress or not based on the detecting of the status;

restricting the output of the guidance for energy saving in the outputting of the guidance when it is determined that the regeneration process of the exhaust gas purifying device is in progress; and displaying the outputted guidance on a display provided to the construction machine.

* * * * *